United States Patent
Sarkar

(10) Patent No.: US 7,182,848 B2
(45) Date of Patent: Feb. 27, 2007

(54) PRODUCTION OF HOLLOW CERAMIC MEMBRANES BY ELECTROPHORETIC DEPOSITION

(75) Inventor: Partha Sarkar, Edmonton (CA)

(73) Assignee: Alberta Research Council, Inc., Edmonton (CA)

( * ) Notice: Subject to any disclaimer, the term of this patent is extended or adjusted under 35 U.S.C. 154(b) by 694 days.

(21) Appl. No.: 10/249,735

(22) Filed: May 5, 2003

(65) Prior Publication Data

US 2003/0178307 A1 Sep. 25, 2003

Related U.S. Application Data

(62) Division of application No. 09/583,274, filed on May 31, 2000, now Pat. No. 6,607,645.

(30) Foreign Application Priority Data

May 10, 2000 (CA) .................................. 2308092

(51) Int. Cl.
*B01D 57/02* (2006.01)
(52) U.S. Cl. ...................... 204/487; 204/484; 204/491; 429/31
(58) Field of Classification Search ................. 204/484, 204/487, 491; 429/31
See application file for complete search history.

(56) References Cited

U.S. PATENT DOCUMENTS

| | | | | |
|---|---|---|---|---|
| 5,002,647 A | * | 3/1991 | Tanabe et al. | ............... 204/484 |
| 5,366,687 A | * | 11/1994 | Dalzell et al. | ............... 204/491 |
| 5,590,387 A | | 12/1996 | Schmidt et al. | ................ 419/36 |
| 5,700,361 A | * | 12/1997 | Shiomitsu et al. | .......... 204/491 |
| 6,270,642 B1 | * | 8/2001 | Basu et al. | .................. 204/487 |

* cited by examiner

*Primary Examiner*—Kishor Mayekar
(74) *Attorney, Agent, or Firm*—Bennett Jones LLP

(57) ABSTRACT

The present invention provides methods for producing hollow ceramic membranes by electrophoretic deposition. The hollow ceramic membranes may have a small cross-sectional area of about $1.0 \times 10^{-5}$ mm$^2$ to about 25 mm$^2$. The cross-sectional configuration of the hollow ceramic membranes may be any geometry such as circular, square, rectangular, triangular or polygonal. The hollow ceramic membranes produced by the methods of the present invention may have multiple layers but always the innermost layer, or the first deposited layer is porous and made by electrophoretic deposition. Subsequent layers may be porous or non porous and deposited before or after sintering the first layer. If it is deposited after sintering, it may require additional sintering steps. Additional layers may be deposited by further electrophoretic deposition, sol-gel coating, dip coating, vacuum casting, brushing, spraying or other known techniques.

5 Claims, 9 Drawing Sheets

US 7,182,848 B2

PRODUCTION OF HOLLOW CERAMIC MEMBRANES BY ELECTROPHORETIC DEPOSITION

CROSS REFERENCE TO RELATED APPLICATIONS

This application is a divisional application of U.S. patent application Ser. No. 09/583,274 filed on May 31, 2000, issued on Aug. 19, 2003 as U.S. Pat. No. 6,607,645, which claimed the priority benefit of Canadian Application No. 2,308,092 filed on May 10, 2000.

BACKGROUND OF INVENTION

The present invention relates to the production of hollow ceramic membranes by electrophoretic deposition. In particular, the present invention relates to the production of small cross-sectional area hollow ceramic membranes by electrophoretic deposition.

It is well known to deposit coatings of material by electrophoretic deposition ("EPD"). EPD is a combination of electrophoresis and deposition. Electrophoresis is the movement of charged particles in an electric field. Deposition is the coagulation of particles into a mass.

In U.S. Pat. No. 5,580,835 to Dalzell et al., a process for creating ceramic fibers by EPD is described. The ceramic fibers produced by this process are fully dense, non-porous fibers. The described EPD process uses a colloidal metal hydrate from an aqueous sol where the metal hydroxide particle size is in the range of about 15 nm. The sols are produced by hydrolysis and peptization of an organometallic compound in an aqueous medium. The resulting ceramic fiber is non-porous and fully dense as a result of the small particle size of the sol and the sintering process. Because the sol is aqueous, hydrogen evolution is unavoidable and steps must be taken to minimize hydrogen evolution and to permit hydrogen to escape such that it does not embed in the deposited material. One means of doing so disclosed in this patent is to use a low potential and to continuously move the fiber during the deposition process.

As is apparent in the Dalzell et al. Patent, it is conventionally believed that in order to achieve uniform deposition, only ceramic particles of submicron size may be used in an EPD process. As a result, the resulting ceramic materials, after sintering, are not porous.

It is desirable for certain applications to produce a porous hollow ceramic fibre or membrane. Such fibres may be produced by extruding a mixture of ceramic powder and polymeric binder as disclosed in U.S. Pat. No. 5,707,584. The extruded tube or fibre may then be heat treated to remove the polymeric binder leaving a porous ceramic matrix. The porous ceramic matrix may then be coated by dipping in sols, drying and sintering to add thin layers to the microporous matrix. These are difficult and costly methods. It would be advantageous to have an alternative method of producing porous ceramic fibres or tubes or hollow ceramic membranes.

Therefore, there is a need in the art for a method of producing porous ceramic fibres or hollow ceramic membranes by electrophoretic deposition.

SUMMARY OF INVENTION

The present invention provides methods for producing hollow ceramic membranes by electrophoretic deposition. The hollow ceramic membranes may have a small cross-sectional area of about $1.0 \times 10^{-5}$ mm$^2$ to about 25 mm$^2$. The cross-sectional configuration of the hollow ceramic membranes may be any geometry such as circular, square, rectangular, triangular or polygonal. The hollow ceramic membranes produced by the methods of the present invention may have multiple layers but always the innermost layer, or the first deposited layer is porous and made by electrophoretic deposition. Subsequent layers may be porous or non porous and deposited before or after sintering the first layer. If it is deposited after sintering, it may require additional sintering steps. Additional layers may be deposited by further electrophoretic deposition, sol-gel coating, dip coating, vacuum casting, brushing, spraying or other known techniques.

Therefore, in one aspect of the invention, the invention is a method of producing a porous hollow ceramic membrane comprising the steps of:

(a) providing a suspension of a particulate ceramic material in a non-aqueous liquid;

(b) electrophoretically depositing the particulate material onto an electrically conductive fibre core;

(c) drying the fibre core bearing the deposited material; and (d) sintering the fibre core bearing the deposited material at a temperature and for a length of time sufficient to combust the fibre core while producing a porous hollow ceramic membrane.

The fibre core may be a bundle of individual fibres which is infiltrated by the particulate material upon electrophoretic deposition such that upon removal of the fibre core, the membrane comprises a hollow core comprising a plurality of elongate cylindrical pores. Alternatively, the fibre core may be coated with an organic binder to prevent infiltration of the particulate material during electrophoretic deposition.

In one embodiment, the porosity of the membrane may be controlled by controlling the duration and temperature of the sintering step, by controlling the particle size, size distribution and/or the surface area of the ceramic material, by adding sintering additives in the suspension where the additives will deposit concurrently with the ceramic material, by adding a combustible particulate material, such as carbon, carbon black or a suitable organic or polymeric material, to the ceramic material which is concurrently deposited with the ceramic material, wherein said combustible material is removed by combustion during the sintering step.

In one embodiment, the electrophoretic deposition step may be repeated at least once using a ceramic particulate material that is different or has different characteristics such that a multi-layer ceramic hollow membrane where each layer has different characteristics results. The electrophoretic deposition step may be repeated at least once under conditions, as described herein, to produce layers having different porosities.

The non-aqueous liquid may be selected from the group comprising of ethanol, methanol, isopropanol, butanol, acetone, butylamine, acetylacetone methyl ethyl ketone or mixtures thereof.

In another aspect of the invention, the invention is a method of producing a tubular electrode supported electrochemical fuel cell comprising the sequential steps of:

(a) electrophoretically depositing an anodic or cathodic material onto a fibre core to create a porous electrode layer;

(b) depositing a solid electrolyte layer onto the electrode layer; and (c) drying and sintering the core bearing the deposited anode or cathode layer and the solid electrolyte layer at a temperature and for a length of time sufficient to combust the core and to create a fully dense electrolyte layer while maintaining the porosity of the inner-electrode layer;

(d) depositing an outer electrode layer onto the solid electrolyte layer, which is of an anodic material if the inner layer comprises a cathodic material, or a cathodic material if the inner layer comprises an anodic material; and (e) sintering the end product at a temperature and for a length of time sufficient to bond the outer electrode layer to the solid electrolyte layer while maintaining the porosity of the outer and inner electrode layers.

Preferably, the electrolyte layer is deposited by electrophoretic deposition.

In another aspect of the invention, the invention is a method of producing a tubular electrode supported electrochemical fuel cell comprising the sequential steps of:

(a) electrophoretically depositing an inner electrode layer comprising an anodic or cathodic material onto a fibre core and sintering the core bearing the inner electrode layer at a temperature and for a length of time sufficient to combust the core and partially densify the inner electrode layer while maintaining the porosity of the inner electrode layer;

(b) depositing a solid electrolyte layer onto the electrode layer; and (c) drying and sintering the core bearing the deposited anode or cathode layer and the solid electrolyte layer at a temperature and for a length of time sufficient to create a fully dense electrolyte layer and bond the electrolyte layer to the inner electrode layer while maintaining the porosity of the inner electrode layer;

(d) depositing an outer electrode layer onto the solid electrolyte layer, said outer electrode layer comprising an anodic material if the inner layer comprises a cathodic material, or a cathodic material if the inner layer comprises an anodic material; and (e) sintering the end product at a temperature and for a length of time sufficient to partially densify the outer layer, bond the outer electrode layer to the solid electrolyte layer while maintaining the porosity of the outer and inner electrode layers.

Preferably, the electrolyte layer is electrophoretically deposited onto the inner electrode layer by inserting an electrophoretic electrode within the inner electrode layer. Alternatively, the inner electrode layer is comprised of a cathodic material and is used as the electrophoretic electrode to electrophoretically deposit the electrode layer onto the inner electrode layer.

In yet another aspect of the invention, the invention is a method of producing a tubular electrode supported electrochemical fuel cell comprising the sequential steps of:

(a) providing a porous hollow inner electrode layer comprising an anodic material; (a) electrophoretically depositing a solid electrolyte layer onto the inner electrode layer by inserting an electrophoretic electrode within the inner electrode layer;

(b) drying and sintering the core bearing the deposited anode or cathode layer and the solid electrolyte layer at a temperature and for a length of time sufficient to create a fully dense electrolyte layer and bond the electrolyte layer to the inner electrode layer while maintaining the porosity of the inner electrode layer;

(c) depositing an outer electrode layer onto the solid electrolyte layer, said outer electrode layer comprising a cathodic material; and (d) sintering the end product at a temperature and for a length of time sufficient to partially densify the outer layer, bond the outer electrode layer to the solid electrolyte layer while maintaining the porosity of the outer and inner electrode layers.

BRIEF DESCRIPTION OF DRAWINGS

The invention will now be described by way of an exemplary embodiment with reference to the accompanying drawings. In the drawings.

DETAILED DESCRIPTION

Figure 1:
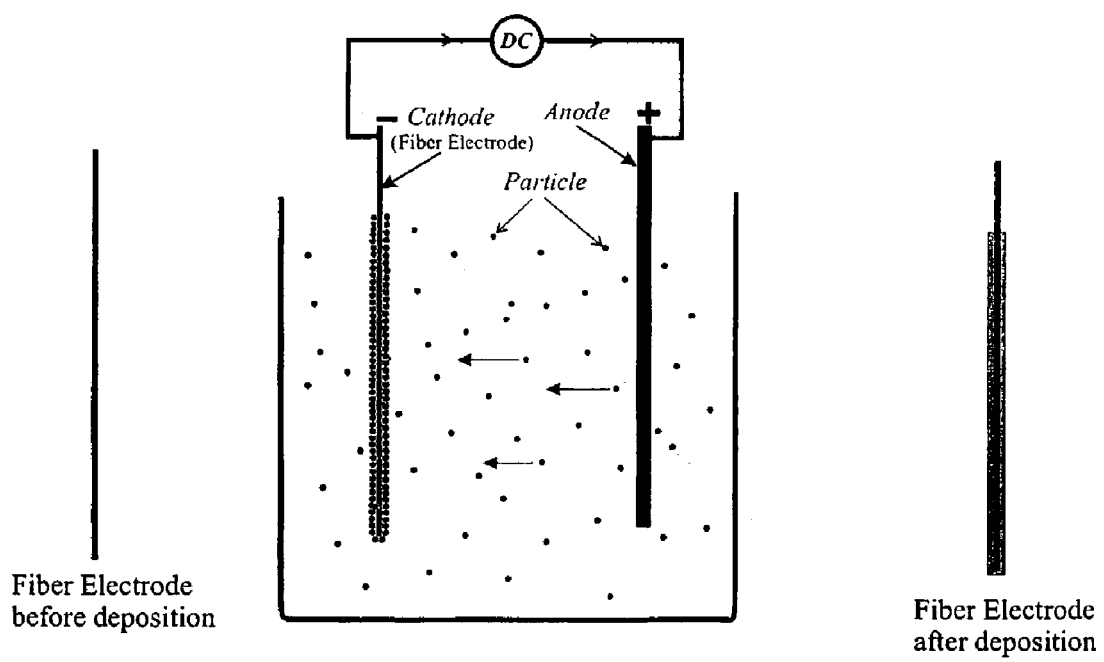
FIG. 1 is a schematic of an EPD setup showing particle deposition on a fibre electrode.

When describing the present invention, the following terms have the following meanings, unless indicated otherwise. All terms not defined herein have their common art-recognized meanings.

The term "fibre" or "filament" refers to a single strand of fibrous material; "fibre tow" or "fibre bundle" shall refer to a multi-filament yarn or an array of fibres; and "fibre core" shall refer to a fibre, filament, fibre tow or fibre bundle. In all cases, the fibre core is electrically conductive or treated to be electrically conductive to allow its use as an electrode.

The term "ceramic" refers to inorganic non-metallic solid materials with a prevalent covalent or ionic bond including, but not limited to metallic oxides (such as oxides of aluminium, silicon, magnesium, zirconium, titanium, chromium, lanthanum, hafnium, yttrium and mixtures thereof) and nonoxide compounds including but not limited to carbides (such as of titanium, tungsten, boron, silicon), silicides (such as molybdenum disicilicide), nitrides (such as of boron, aluminium, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, ceramic solid ionic conductors (such as yttria stabilized zirconia, beta-alumina and cerates).

The term "hollow ceramic membrane" shall refer to a small ($1.0 \times 10^{-5}$ mm$^2$-25 mm$^2$) cross-sectional area ceramic body comprising at least one layer of a porous ceramic material. In a multilayer membrane, the innermost layer is porous and the subsequent layers may be porous or nonporous. The cross-sectional geometry of the hollow ceramic membranes may be any shape such as circular, square, rectangular, triangular or polygonal.

The term "porous", in the context of hollow ceramic membranes means that the ceramic material contains pores (voids). Therefore, the density of the porous ceramic material is lower than that of the theoretical density of the ceramic material. The voids in the porous ceramics can be connected (i.e., channel type) or disconnected (i.e., isolated). In a porous hollow ceramic membrane, the majority of the pores are connected. To be considered porous as used herein, a ceramic membrane should have a density which is at most about 95% of the theoretical density of the material. The amount of porosity can be determined by measuring the bulk density of the porous body and from the theoretical density of the materials in the porous body. Pore size and its distribution in a porous body can be measured by mercury or non-mercury porosimeters, BET or microstructural image analysis as is well known in the art.

The present invention provides an electrophoretic method of producing hollow ceramic membranes. The methods disclosed herein may be used to produce such membranes having multiple concentric layers of varying compositions. One particular application of such methods includes the production of solid oxide fuel cell tubes. As well, the methods disclosed herein may be used to produce functionally graded hollow ceramic membranes where either material composition, amount of porosity, pore size distribution or the microstructure, or a combination of these characteristics, may vary along the cross section.

EPD (electrophoretic deposition) is an electrochemical deposition technique for depositing minute particles of materials such as metals, glass, ceramics, polymers or carbon in a colloid suspension by subjecting the particles to an external dc electric field, thereby causing the migration of the particles toward a specific electrode. Particles in a colloid are known to develop a surface charge relative to the suspension medium, which may be dependent on the pH of the suspension medium. For example, alumina has a positive charge as a result of ionization at a pH of below about 7. In the formation of ceramic green bodies by EPD, the ceramic particles may be positively or negatively charged; in case of positively charged particles they are deposited on the cathode; and in case of negatively charged particles they are deposited on the anode. It is not essential for the deposition process that the particles have to reach the oppositely charged electrode; particles can be deposited around an electrode onto a semipermeable membrane which allow ions to pass but not the particles themselves. The oppositely charged electrode on which the ceramic particles are deposited (in the absence of a semipermeable membrane) is referred to herein as the "deposition electrode". This is shown schematically in FIG. 1.

The ceramic material used in the present invention may include those compounds referred to above or mixtures thereof. However, the invention is not limited to any chemical compound specifically referred to herein and should be considered to include any ceramic or similar material which may be electrophoretically deposited from a non-aqueous suspension in accordance with the methods disclosed herein.

The present invention may be utilized to electrophoretically deposit a plurality of coatings on a wide range of fibre cores, both metallic and non-metallic. Any fibre core with any small cross-sectional geometry may be coated with the disclosed methods if it is electrically conductive or may be treated to be electrically conductive and may be combusted at temperature levels reached during a sintering process. Fibre cores made from carbon or graphite are considered most suitable for use herein.

The present invention may be used with fibre cores of varying diameters. At one end of the range, individual filaments having a diameter of approximately 5 microns or less may be suitable to produce very fine hollow ceramic membranes. At the other end of the range, fibre tow having a diameter of about 5 or 6 mm may be used to produce larger hollow ceramic membranes. At the larger end of the range, rods having a desired diameter may be used in place of fibre tow. As well, the rods may have any suitable cross-sectional configuration.

Figure 3A:
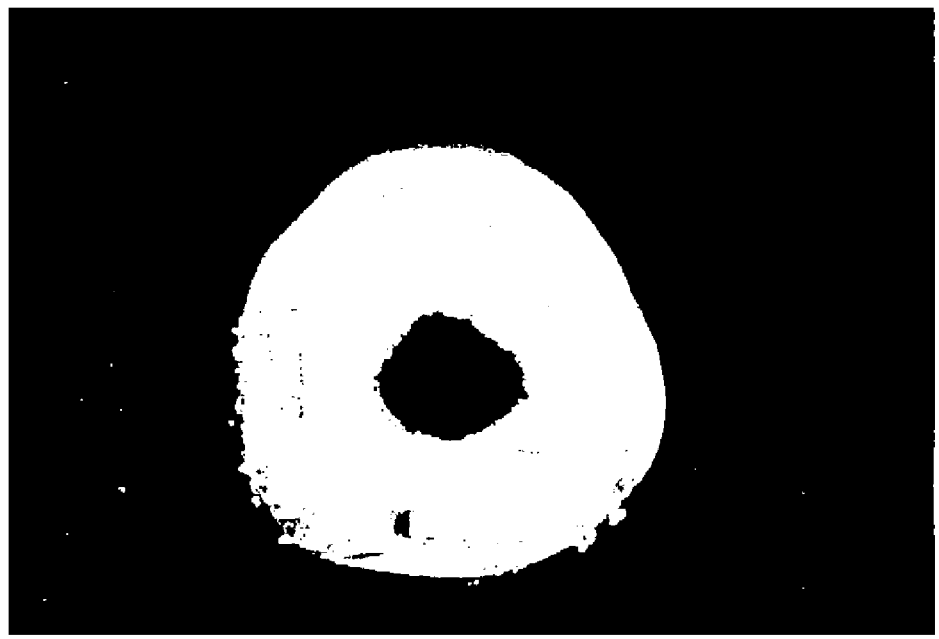
FIG. 3A is a scanning electronic micrograph (SEM) of a fracture surface hollow ceramic membrane at 70× magnification.
Figure 3B:
FIG. 3B is the same fraction surface at a higher magnification.
Figure 6A:
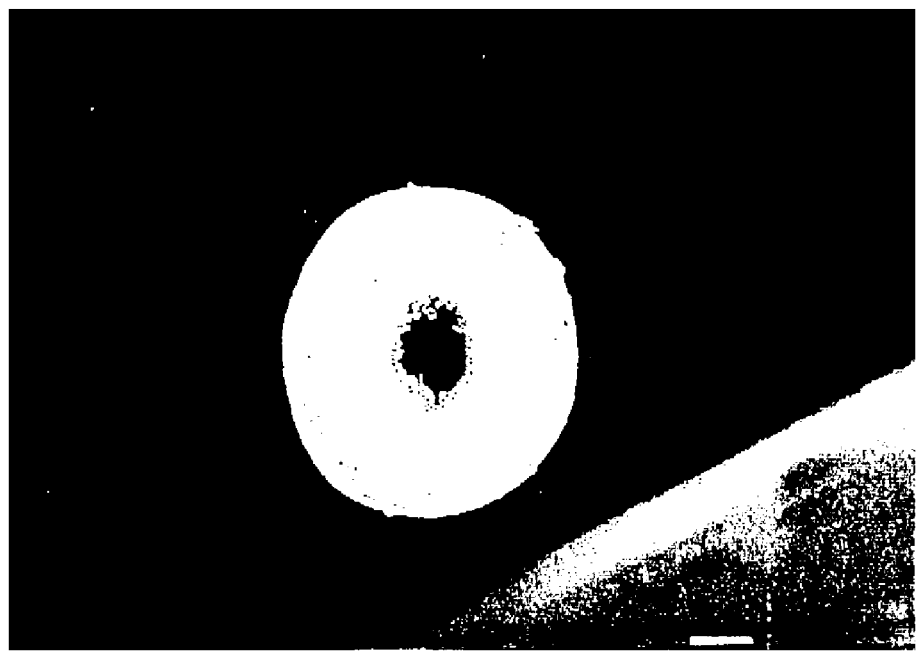
FIG. 6A is a SEM of a cross-sectional fracture surface showing a porous core resulting from the use of untreated fibre tow as the fibre core (70×).
Figure 6B:
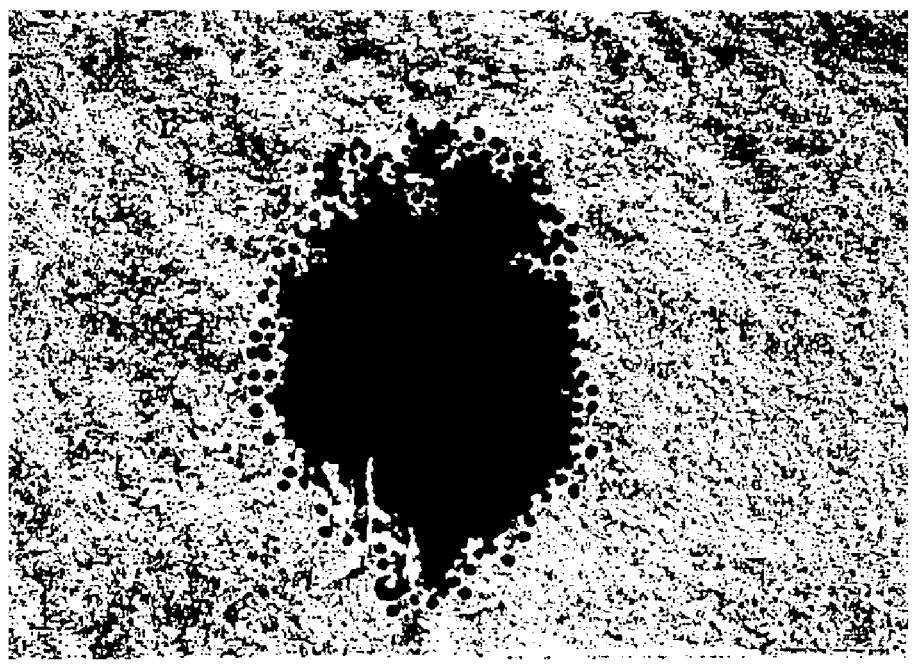
FIG. 6B is the same fracture surface at higher magnification (300×).

Fibre tow may be used either treated with a polymeric binder or untreated. A treated fibre core will produce a ceramic tube having substantially a single hole as seen in FIGS. 3A and 3B. A fibre core made from untreated fibre tow may result in a ceramic tube having a plurality of holes in a porous core, as is seen in FIGS. 6A, 6B and 6C. The fibre tow may be treated by briefly dipping the tow into a solution of an organic or polymeric binder before immersion in the electrophoretic medium. In one example, a solution of nitrocellulose in acetone is suitable. The nitrocellulose forms a very thin coating on the tow and seals the interfilamentous gaps. The binder should preferably be insoluble in the EPD medium. Nitrocellulose is a preferred binder because it is insoluble in ethanol, which is a preferred EPD medium.

Fibre tow which has been treated with an organic binder may be fashioned into a shaped deposition electrode, other than a simple elongate deposition electrode, by manipulating the fibre tow before the binder dries. For example, the fibre tow may be fashioned into a deposition electrode having helical shape or a "U" or "J" shape. The resulting hollow ceramic membrane will of course have the shape of the deposition electrode, which may be useful in certain applications.

If the intrafilamentous gaps are unsealed, as in untreated fibre tow, the deposited particles may infiltrate the tow during the deposition process, resulting in the porous core referred to above. The porous core may be preferred in some applications in which a high internal surface area may be beneficial. Examples of such application include high surface area catalyst supports or membrane reactors.

The ceramic material used in the deposition process preferably comprises particulate ceramic material having a particle size larger than about 150 nm. A suitable suspension of the ceramic material may be made by grinding ceramic powder using grinding media in a suitable non-aqueous medium i.e. an organic liquid, such as ethanol, isopropanol, butanol, butylamine, acetylacetone, methyl ethyl ketone, acetone, methanol, absolute alcohol or mixtures thereof for a specified period of time until the average particle size reaches the appropriate size range. In one embodiment, the particle size may range from about 150 nm to about 10,000 nm. The particles should preferably be no larger than about 15,000 nm. More preferably, the particle size range may be between about 200 nm to about 1000 nm. As will be appreciated by those skilled in the art, larger particle sizes may result in a ceramic membrane having greater porosity than a ceramic membrane resulting from smaller particle sizes.

As shown schemicatially in FIG. 1, the EPD process may commence by providing a suitable length of fibre core and connecting it to a suitable EPD apparatus which is well known in the art. The fibre core may then be immersed in the ceramic particle suspension and electric potential applied at a specified level for a suitable length of time. It may be important to pre-immerse and withdraw the fibre core once before immersion for EPD in the EPD suspension or any liquid. During early trials, it was found that if such a step was not performed, the resulting coated fibre core often demonstrated gross irregularities in diameter after deposition. This problem was alleviated by immersing the fibre tow into the suspension and slowly removing it. It is believed that during removal, surface tension forces pulled all the individual filaments of the tow together to ensure the tow has a uniform round diameter when re-immersed for EPD. This step is unnecessary for single filament fibre cores or rods.

The choice of appropriate EPD conditions such as current, voltage and length of time will vary with the desired end product and is well within the ordinary skill of one skilled in the art. In one embodiment, the current may vary from about 0.01 mA to about 1.0 mA per centimeter of deposit length, over a time period of about 30 seconds to about 300 seconds. The current and length of deposition may be varied to achieve membranes of differing thickness. After EPD, the coated fibre core is then removed from the suspension and dried in preparation for sintering. The drying step may take place at room temperature or a slightly elevated temperature.

Figure 2:
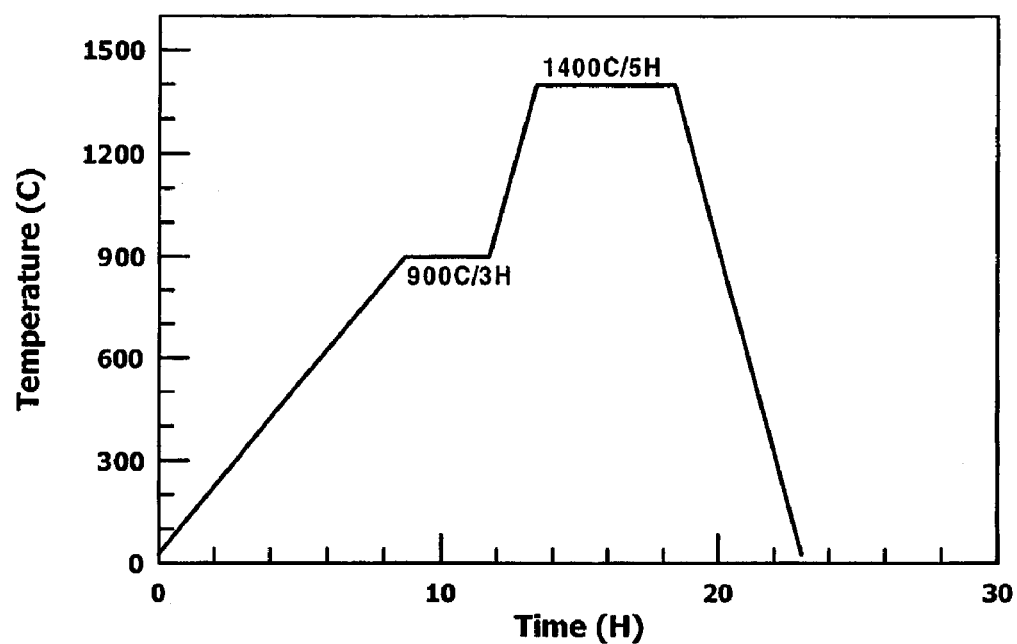
FIG. 2 is a graphical representation of a sintering cycle of the present invention.

In one embodiment, the sintering cycle for an alumina or zirconia deposit where the sintering atmosphere is air may begin by raising the temperature to about 500° C. to about 900° C. over a period of about 6 hours to about 9 hours and held at that temperature for about 3 hours. The temperature may then be raised at a rate of about 100° C. to about 500° C. per hour to the sintering temperature of about 1150° C. to about 1500° C. and held there for about 0.5 to about 10 hours. The temperature may then be lowered at a rate of about 100° C. to about 500° C. per hour to room temperature. One example of a sintering cycle falling within this embodiment is illustrated graphically in FIG. 2.

In another embodiment, the sintering cycle for a boron carbide deposit where the sintering atmosphere is a vacuum or argon may begin by raising the temperature to about 600° C. over a period of about 3 hours to about 6 hours and held at that temperature for about 1 hour. The temperature may then be raised to about 900° C. to about 1100° C. over 0.5 to about 5 hours and held there for about 0.5 about 3 hours. The temperature may then be raised by about 300° C. to about 800° C. per hour up to the sintering temperature of about 1800° C. to about 2250° C. and held there for about 0.25 to about 5 hours. The temperature may then be lowered at a rate of about 100° C. to about 800° C. per hour to room temperature.

It may be important to hang the ceramic tubes vertically during sintering to prevent curvature of the tubes. Curvature of the tubes may be the result of nonisotropic heat transfer kinetics if the ceramic tubes are laid flat on supports during sintering or due to the friction between the support and the hollow ceramic membrane.

Porosity of the ceramic tubes or hollow fibres or hollow ceramic membranes may be enhanced by mixing combustible particles such as carbon black, carbon, graphite, different polymer powders and cellulose base powders into the ceramic particle suspension such that the combustible particles co-deposit during EPD. Then, when the ceramic coated core is heated to sinter the hollow ceramic membranes and remove the core, the combustible particles will also be burned off, resulting in a more porous ceramic membrane.

As well, porosity may be controlled by controlling the temperature and time of the sintering process. Long sintering times or sintering at higher temperature or combination of both can reduce porosity. Porosity can also be controlled by controlling the particle size distribution and its surface area. Finer and high surface area ceramic particles normally will have lower porosity than coarse and low surface area powder when both of them are sintered under identical conditions. Porosity can also be controlled by sintering additives which are well known in the art, such as glassy or sol-gel phase or any other liquid forming phases. The time and temperature parameters in a typical sintering cycle, such as that illustrated in FIG. 2 may be varied by one skilled in the art to achieve a particular desired result.

A functionally graded composite hollow ceramic membrane may be produced by varying the composition of the EPD suspension during the deposition process. For example, a suspension of yttria stabilized zirconia may be continuously added to a suspension of alumina during EPD to produce a ceramic tube which has a gradient of YSZ composition ranging from none or very little near the inner diameter of the membrane to close to 100% near the outer diameter of the membrane. Alternatively, the fibre core may be deposited onto from a series of suspensions having varying proportions of the materials desired in the composite end product. Similarly, a porosity or pore size distribution graded hollow ceramic membrane can be fabricated by changing the powder composition such a way that the sinterability of the deposit varies along the cross section. In one embodiment, the particle size distribution may changed during the deposition step, which may result in a porosity graded membrane. Also, porosity graded hollow ceramic membranes can be manufactured by changing the concentration or particle size of a combustible material such as carbon black, carbon, graphite or polymer powders along the cross-section of the deposit. Porosity may also be varied along the cross-section of the membrane by varying the concentration of a sintering aid during the deposition step.

A thin surface layer of a functional material may be added to the hollow ceramic membrane by sol-gel coating, dip coating, electroless metal coating, polymer coating, vacuum casting, spraying or brushing or other well-known techniques for coating tubes or hollow fibres. The resulting coated hollow ceramic membrane may be used as a solid oxide fuel cell, a separation membrane or in a membrane reactor, amongst other uses. The hollow ceramic membranes will act as a support or substrate for the functional surface layer which will have the desired properties for a particular application. For example, a separation membrane requires a specific pore size or size distribution. The support layer will have a larger pore size than the final layer but the surface layer will generally be thinner. So the function of the support layer in this particular example to provide mechanical support to the final layer because a self supporting thin functional layer can not be made. In one particular example, a thin palladium layer may be added to a hollow ceramic membrane by electroless plating. The palladium/ceramic tube may be used in a membrane separator for separating hydrogen which is permeable through palladium, which is otherwise non-permeable.

In one embodiment, multiple concentric layers may be deposited using the methods of the present invention. If the first or innermost layer is porous, it may act as a semipermeable membrane and allow further EPD to deposit additional layers. A series of deposition steps with different ceramic materials may be followed by a single sintering step. Alternatively, a sintered hollow ceramic membrane may be used to deposit an additional layer or layers of ceramic material by further EPD, sol-gel coating, dip-coating, vacuum casting, spray coating or similar technologies which is then sintered. The different layers may chosen to provide the finished product with a variety of different properties or capabilities for a variety of applications.

In one embodiment of a multilayer ceramic tube, the methods disclosed herein may be used to produce a tubular solid oxide fuel cell. In a typical planar electrode supported solid oxide fuel cell (SOFC), the cell is comprised of a porous anode layer, a fully dense electrolyte and a porous cathode layer. Electrochemical reactions in the anode and cathode produce electricity. The electrolyte permits flow of oxygen ions from the cathode to the anode where a fuel is oxidized to release electrons. The electrons travel back to the cathode externally to complete the circuit. The fuel cell may be anode-supported in which case the anode layer will be thicker than the electrolyte of cathode layers. In one example, the anode layer may typically be about 0.1 to about 3 mm thick, preferably about 1.5 mm thick, and comprise a nickel/yttria stabilized zirconia ("YSZ") composite material. The electrolyte may be fully dense YSZ about 0.002 to about 0.1 mm thick, preferably about 0.01 mm thick, while the cathode may be comprised of a mixed conductor oxide layer such as Sr doped $LaMnO_3$ (LSM) which may be about 0.01 mm to about 0.5 mm thick, preferably about 0.04 mm thick. Such planar solid oxide fuel cells are well known in the art.

To produce a tubular SOFC in one embodiment, an inner electrode layer, which may be either an anode or a cathode, is deposited onto the fibre core to a desired thickness. Secondly, a thin solid electrolyte layer is then deposited. This intermediate product is then sintered to achieve full density of the solid electrolyte layer while maintaining the porosity on the inner electrode. By using different average particle sizes for the solid electrolyte and anode deposition suspensions, the anode layer and the electrolyte layer will have two different sintering kinetics so that for a given sintering cycle, the electrolyte would be nonporous (fully dense) but the anode would be porous. The porosity of the anode layer may be enhanced using combustible particles into the anode particle suspension. In addition or alternatively, sintering additives may be added to the electrolyte layer to enhance the densification of the electrolyte layer. Lastly, the cathode layer is deposited onto the electrolyte layer by any suitable means including dip-coating, brushing, spraying or sol-gel coating, followed by a final sintering stage of the tubular SOFC membrane to partially densify the outer cathode layer and bond the outer cathode layer to the electrolyte layer.

It is possible to electrophoretically deposit the outer cathode layer onto the electrolyte layer if a thin layer of a conducting material is applied to the electrolyte layer so that it may be used as an deposition electrode.

Various alternatives to this method are possible. In one embodiment, the inner layer is a cathodic material which will remain electrically conductive after sintering. In this case, the electolyte layer may be electrophoretically deposited onto the cathode layer even after the fibre core has been removed when sintering the cathodic layer.

In another embodiment, the inner layer is an anodic material which may not be conductive. In this case, the electrolyte layer may be electrophoretically deposited onto the anode layer, after the anode layer has been sintered and the fibre core removed, by inserting a deposition electrode within the hollow anode layer and filling the hollow anode layer with the EPD medium such as ethanol, without the particulate suspension. Because of the porosity of the anode layer, the electric field will penetrate the anode layer, causing the electrolyte particle to deposit onto the anode layer. In other words, the anode layer is acting as a semi-permeable membrane during EPD. After the electrolyte layer is deposited, the anode and electrolyte layers are sintered to densify the electrolyte layer while maintaining the porosity of the anode layer. The cathodic layer may then be added by any suitable conventional technique such as dip coating or sol-gel coating.

This alternative method may be applied to any hollow ceramic membrane whether or not it has been formed by EPD. For example, a hollow ceramic membrane may be formed by extrusion or slip casting which is electrically nonconductive. The membrane may then be immersed in an EPD suspension and filled with the EPD medium. A deposition electrode may then be inserted within the hollow membrane and another layer of ceramic material deposited onto the hollow membrane. The hollow membrane must of course be sealed at the end which is immersed into the EPD suspension.

The following examples are intended to illustrate specific embodiments of the present invention and should not be considered limiting of the claimed invention in any way.

EXAMPLE 1

100 g of alumina powder was mixed with 250 g of YSZ grinding media (5 mm diameter) in 200 ml of absolute ethanol and vibromilled for about 15 hours. The resulting alumina particle size ranged from 200 to 2000 nm, with a median diameter of about 300 nm. Approximately 750 ml of ethanol was added to dilute the alumina to about 10 g per 100 ml of ethanol. The suspension was acidified using concentrated acetic acid or dilute HCl (or both) to a pH of below 5, preferably about 4. The suspension was then tested for appropriate deposition.

A carbon fibre tow of about 100 micron diameter was prepared by dipping briefly in a nitrocellulose/acetone solution. The suspension was deposited onto the fibre core with a current of about 0.5 mA for about 300 seconds. The resulting coated fibre core was air dried for about 12 hours and then sintered. The sintering cycle began by raising the temperature to about 900° C. over a 9 hour period and held there for about three hours. The temperature was then raised by 300° C. per hour up to the sintering temperature of 1400° C. and held there for about 5 hours. The ceramic tube was then allowed to cool at a rate of 300° C. per hour to room temperature. A cross-section of the resulting porous tube is seen in FIGS. 3A and 3B.

EXAMPLE 2

Figure 4A:
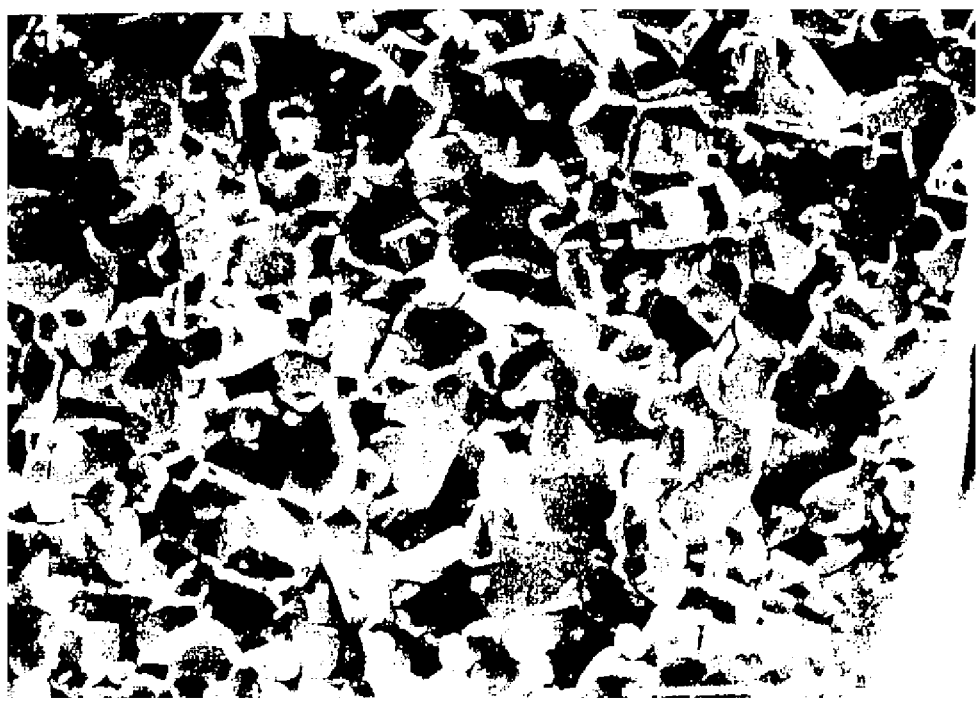
FIG. 4A is a SEM of a cross-sectional fracture surface of a hollow ceramic membrane sintered at 1550° C. for 5 hours.
Figure 4B:
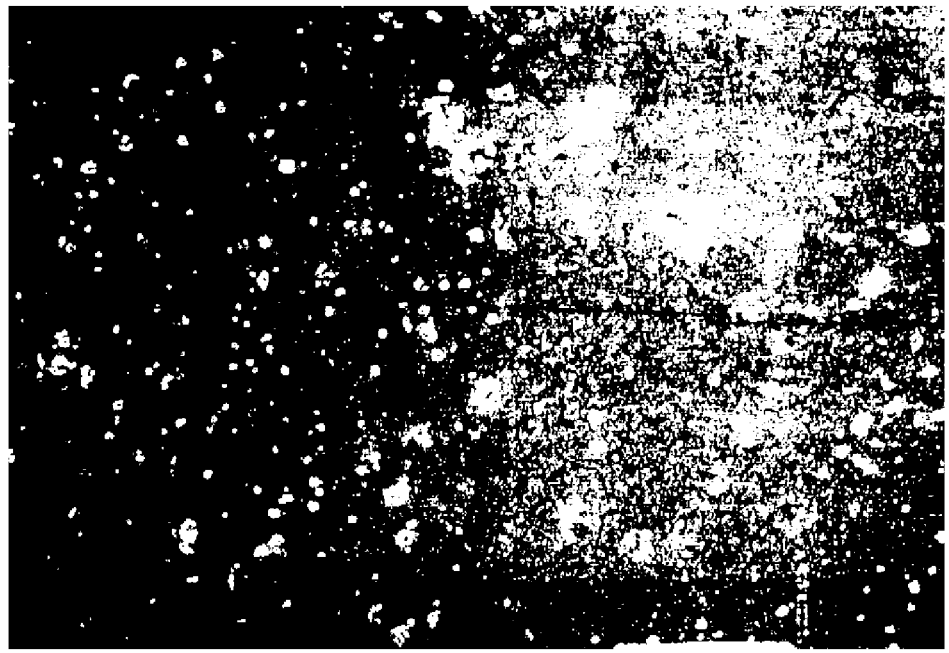
FIG. 4B is a SEM of a similar membrane sintered at 1400° C. for 5 hours.
Figure 4C:
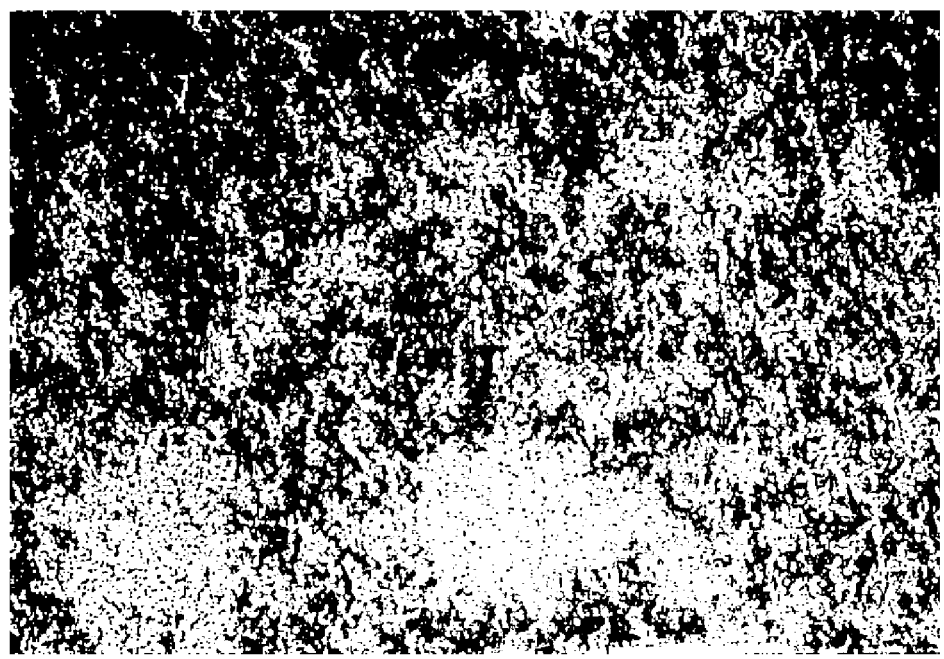
FIG. 4C is a SEM of a similar membrane sintered at 1250° C. for 5 hours. Each SEM is at 2000× magnification.

In one example, particulate carbon black having a particle size range of about 20 nm to about 150 nm, was added to the alumina suspension prepared in accordance with Example 1 above in about 29 v/o such that the carbon and alumina were co-deposited onto the fibre core. The resulting ceramic membrane was sintered at 1250° C. for 5 hours. FIG. 4 shows that the carbon black increases the porosity of the membrane.

EXAMPLE 3

Figure 5:
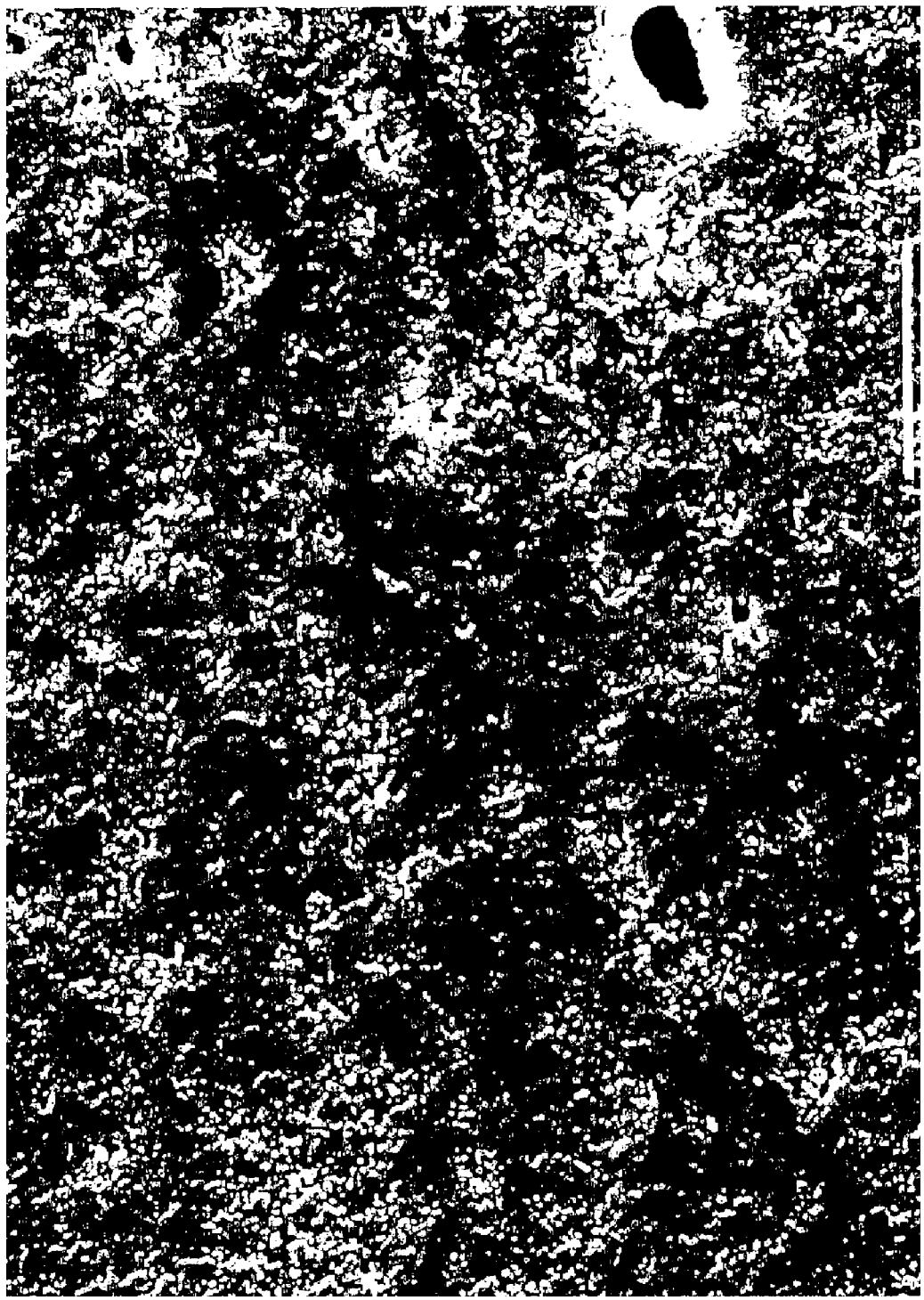
FIG. 5 is a SEM of a polished cross-sectional surface showing porosity created by carbon black particles in the deposition suspension (2000×).

An untreated fibre tow was used to deposit alumina particles as otherwise described in Example 1 above. The resulting ceramic membrane having a porous core is shown in FIGS. 5A and 5B. The core has a plurality of longitudinal holes, which correspond to individual filaments of the fibre tow.

EXAMPLE 4

Figure 7:
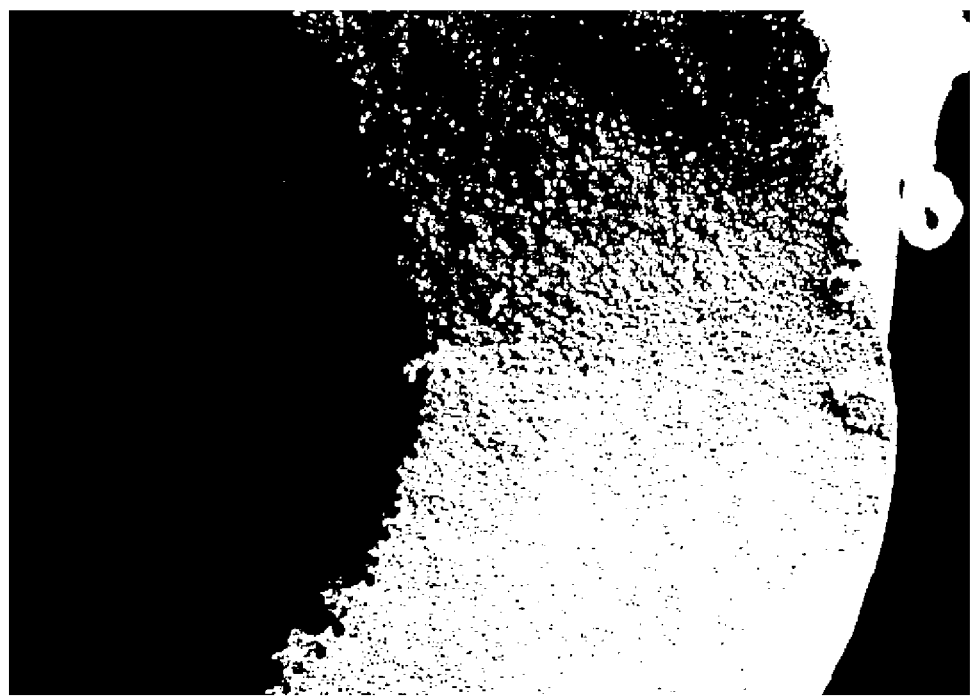
FIG. 7 is a SEM of a cross-sectional fracture surface of a ceramic hollow membrane produced using a fibre core comprising fibre tow having a diameter of approximately 400 microns.
Figure 8:
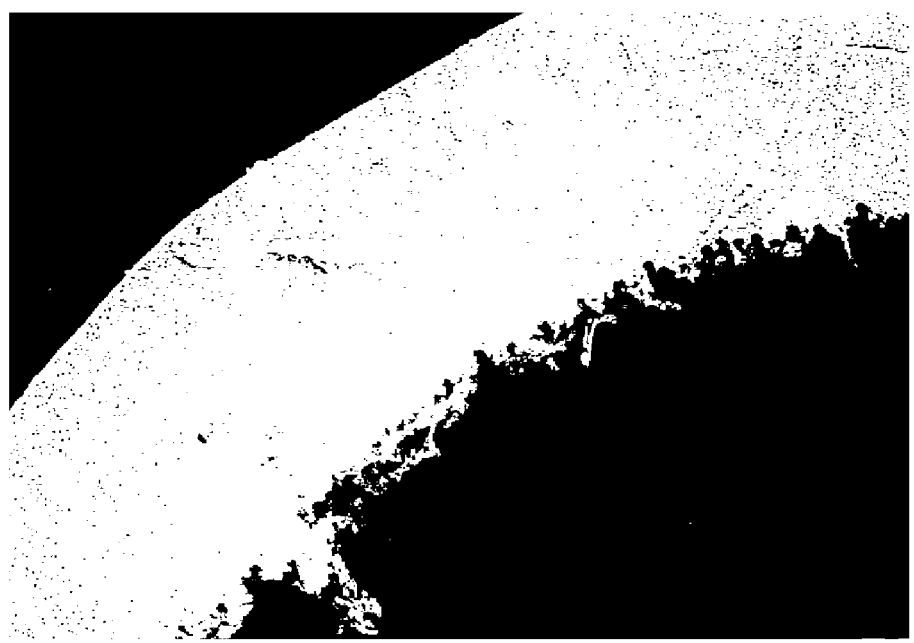
FIG. 8 is a SEM of a cross-sectional fracture surface of a ceramic hollow membrane produced using a fibre core comprising fibre tow having a diameter of approximately 650 microns.

Fibre cores comprising fibre tow of varying sizes was used for depositing alumina particles as otherwise described in Example 1 above. The fibre tow diameters used were approximately 400 µm (FIG. 7) to 650 µm (FIG. 8). The resulting ceramic tubes are shown in FIGS. 7 and 8.

As will be apparent to those skilled in the art, various modifications, adaptations and variations of the foregoing specific disclosure can be made without departing from the scope of the invention claimed herein.

The invention claimed is:

1. A method of producing a tubular electrode supported electrochemical fuel cell comprising the sequential steps of:
   (a) electrophoretically depositing an anodic or cathodic material onto a filament core to create a porous inner electrode layer having a first porosity;
   (b) depositing a solid electrolyte layer onto the porous inner electrode layer; and
   (c) drying and sintering the filament core bearing the porous inner electrode layer and the solid electrolyte layer at a temperature and for a length of time sufficient to combust the core and to create a fully dense electrolyte layer while maintaining the porosity of the inner electrode layer;
   (d) depositing an outer electrode layer, having a second porosity, onto the solid electrolyte layer, which is of an anodic material if the inner layer comprises a cathodic material, or a cathodic material if the inner layer comprises an anodic material; and
   (e) sintering the porous inner electrode layer, the solid electrolyte layer and the porous outer electrode layer, at a temperature and for a length of time sufficient to bond the outer electrode layer to the solid electrolyte layer while maintaining the porosity of the porous inner electrode layer and the porosity of the outer electrode layer.

2. The method of claim 1 wherein the electrolyte layer is deposited by electrophoretic deposition.

3. A method of producing a tubular electrode supported electrochemical fuel cell comprising the sequential steps of:
   (a) electrophoretically depositing a porous inner electrode layer, having a first porosity, comprising an anodic or cathodic material onto a filament core, and sintering the core bearing the inner electrode layer at a temperature and for a length of time sufficient to combust the core and partially densify the inner electrode layer while maintaining the first porosity of the inner electrode layer;
   (b) depositing a solid electrolyte layer onto the electrode layer; and
   (c) drying and sintering the filament core bearing the porous inner electrode layer and the solid electrolyte layer at a temperature and for a length of time sufficient to create a fully dense electrolyte layer and bond the electrolyte layer to the porous inner electrode layer while maintaining the porosity of the porous inner electrode layer; and
   (d) depositing an outer electrode layer, having a second porosity, onto the solid electrolyte layer, said outer electrode layer comprising an anodic material if the inner layer comprises a cathodic material, or a cathodic material if the inner layer comprises an anodic material; and
   (e) sintering the porous inner electrode layer, the solid electrolyte layer and the outer electrode layer at a temperature and for a length of time sufficient to partially densify the outer layer, bond the outer electrode layer to the solid electrolyte layer while maintaining the porosity of the porous inner electrode layer and the porosity of the outer electrode layer.

4. The method of claim 3 wherein the electrolyte layer is electrophoretically deposited onto the inner electrode layer by inserting an electrophoretic electrode within the inner electrode layer.

5. The method of claim 3 wherein the inner electrode layer is comprised of a cathodic material and is used as the electrophoretic electrode to electrophoretically deposit the electrolyte layer onto the inner electrode layer.

* * * * *